United States Patent
Hahn et al.

(10) Patent No.: US 8,897,936 B2
(45) Date of Patent: Nov. 25, 2014

(54) DEVICE FOR STABILISING THE GUIDANCE OF A VEHICLE

(75) Inventors: Klaus-Uwe Hahn, Wedenburg (DE); Ute Marita Meissner, Cologne (DE)

(73) Assignees: Deutsches Zentrum fuer Luft- und Raumfahrt e.V., Cologne (DE); Ute Marita Meissner, Cologne (DE)

( * ) Notice: Subject to any disclaimer, the term of this patent is extended or adjusted under 35 U.S.C. 154(b) by 0 days.

(21) Appl. No.: 13/518,204

(22) PCT Filed: Dec. 21, 2010

(86) PCT No.: PCT/EP2010/007810
§ 371 (c)(1),
(2), (4) Date: Aug. 14, 2012

(87) PCT Pub. No.: WO2011/079924
PCT Pub. Date: Jul. 7, 2011

(65) Prior Publication Data
US 2012/0310452 A1   Dec. 6, 2012

(30) Foreign Application Priority Data
Dec. 23, 2009 (DE) .......................... 10 2009 060 562

(51) Int. Cl.
*B64C 25/50* (2006.01)
*B60T 13/74* (2006.01)
*G05B 11/36* (2006.01)

(52) U.S. Cl.
CPC ..................................... *B64C 25/50* (2013.01)
USPC ......................................... 701/16; 303/117.1

(58) Field of Classification Search
CPC ....................................................... B64C 25/50
USPC ......................................... 701/16; 303/117.1
See application file for complete search history.

(56) References Cited

U.S. PATENT DOCUMENTS

2006/0071547 A1* 4/2006 Holder ...................... 303/117.1

FOREIGN PATENT DOCUMENTS

WO    WO 2006096446 A2 *  9/2006
WO         2007110566 A1   10/2007

* cited by examiner

*Primary Examiner* — Calvin Cheung
*Assistant Examiner* — Yazan A Soofi
(74) *Attorney, Agent, or Firm* — Whitham Curtis Christofferson & Cook, PC

(57) ABSTRACT

The invention relates to a device (10) for stabilizing the guidance of a vehicle (1), the vehicle (1) having at least one or two which is arranged in such a way that it can be turned relative to the longitudinal axis of the vehicle (1), and steering means that interact with the at least one wheel (2) and are designed to guide the vehicle (1) by turning the at least one wheel (2). The device (10) has a detecting unit (12), which is designed to detect an at least partial transition from static friction to dynamic friction between the at least one wheel (2) and a ground covering (3), and furthermore has a control unit (11), which, when the detecting unit (12) detects the transition from static friction to dynamic friction, is designed to turn the at least one wheel (2) by means of the steering means in such a way that the dynamic friction between the wheel (2) and the ground covering (3) changes back to static friction.

5 Claims, 3 Drawing Sheets

DEVICE FOR STABILISING THE GUIDANCE OF A VEHICLE

FIELD OF THE INVENTION

The invention relates to a device for stabilizing the guidance of an aircraft, the aircraft having at least one wheel which is arranged in such a way that it can be turned relative to the longitudinal axis of the vehicle, and steering means that interact with the at least one wheel and are designed to guide the vehicle by turning the at least one wheel.

BACKGROUND

Aircraft are designed to travel through the air, i.e. the structure thereof is optimized for air as a medium. However, even aircraft have structural means which enable them to travel along the ground, referred to as the undercarriage. The undercarriage of an aircraft serves to enable the aircraft to move safely and comfortably even in contact with the ground. Moreover, the undercarriage is also used for landing or starting the aircraft, i.e. for transferring the aircraft from or to the proper medium for its movement. In particular, ground contact is reduced to a relatively small area in relation to the weight and size of the aircraft by the wheels arranged on the undercarriage, and therefore, due to poor weather conditions, for example, and the resulting poor condition of the runway, a risk to safety may arise. Thus it is conceivable, for example, that crosswinds, an engine failure or failure of reverse thrust on one side may lead to corresponding transverse forces on the undercarriage of a magnitude such that the wheels of the undercarriage lose ground adhesion. The wheels then begin to skid and maneuverability is impaired.

However, even in the case of a crosswind landing by the De-Crab method, in which the aircraft approaches the runway at a correction angle in the direction of the wind and hence the wheels of the undercarriage are not aligned in the actual direction of motion of the aircraft, it is possible, if the pilot does not steer the longitudinal axis of the aircraft in the direction of motion at the right time, just before touchdown, that the wheels may touch down on the runway at a corresponding angle and begin to skid due to the speed and weight of the aircraft, severely impairing maneuverability and therefore safety.

U.S. Pat. No. 6,722,610 B1, for example, has disclosed a steerable undercarriage for aircraft which, in the case of a crosswind landing by the De-Crab method, aligns the wheels of the undercarriage in the direction of motion of the aircraft, thus allowing the aircraft to land safely on the runway at the correction angle required by the crosswind without the pilot turning the longitudinal axis of the aircraft in the direction of motion beforehand, this being regarded as the most critical moment in such a crosswind landing. Any transverse forces on the undercarriage of the aircraft can thus be avoided.

The abovementioned patent document furthermore describes a method for increasing the braking effect after the aircraft touches down by turning the pivotably arranged wheels of the undercarriage by such an angle over the direction of motion of the vehicle that abrasion of the rubber of the wheels is increased. This is supposed to ensure that the aircraft slows down more quickly or that deceleration increases owing to the increased friction between the ground covering and the tires. However, there is the risk here that the static friction between the ground covering and the tires, which is necessary for ground contact, may change to dynamic friction, this being referred to colloquially as skidding and leading to the aircraft becoming unstable and no longer having acceptable maneuverability. Moreover, dynamic friction has the disadvantage as compared with static friction that the braking effect declines significantly since its coefficient of friction is lower than that with static friction, and hence less energy, kinetic energy, is converted by friction. Moreover, this method has the considerable disadvantage that extreme transverse forces act on the undercarriage of the aircraft, which is not designed for this, leading potentially, in the worst case, to breakage of the undercarriage. Ultimately, therefore, this method is not suitable in practice for ensuring safe and comfortable landing of an aircraft.

In the case of land vehicles too, however, e.g. cars, the transition from static friction to dynamic friction between the ground covering and the wheels is known. Such a transition occurs, for example, when a vehicle which does not have ABS is braked sharply and the wheels lock up. The braking distance of such a vehicle is significantly greater since less energy can be dissipated by dynamic friction than by means of static friction. In the case of sharp steering movements too, however, the front wheels of a car may lose adhesion and thus not steer in the desired direction but begin to skid, the result being that the vehicle maintains its previous direction of motion.

SUMMARY

It is therefore the object of the present invention to eliminate such skidding of vehicles guided by means of wheel/ground contact in the case where it occurs.

According to the invention, the object is achieved, using the initially mentioned device for guidance stabilization, by virtue of the fact that the device has a detecting unit, which is designed to detect an at least partial transition from static friction to dynamic friction between the at least one wheel and a ground covering, and the device furthermore has a control unit, which, when the detecting unit detects the transition from static friction to dynamic friction, is designed to turn the at least one wheel by means of the steering means in such a way that the dynamic friction between the wheel and the ground covering changes back to static friction.

In the sense in which it is used in the present invention, turning the wheel provided for guiding the vehicle is understood to mean turning in such a way that the wheel is turned or pivoted relative to the longitudinal axis of the vehicle, the turning or pivoting axis being substantially parallel to the yaw or vertical axis of the vehicle.

The present invention uses an appropriate detecting unit to detect the at least partial transition from static friction to dynamic friction between the at least one wheel and the ground covering, something which can occur, for example, when the wheel is acted upon by relevant transverse forces, which lead to a loss of wheel adhesion. The wheel would thus begin to skid. Thus, if the detecting unit detects skidding or the transition from static friction to dynamic friction, then, according to the invention, an intervention is made in the steering by means of a control unit in such a way that the wheels are turned and thus the direction of running thereof is modified, ensuring that the dynamic friction between the wheel and the ground covering changes back to static friction. This is advantageous, for example, particularly when the steering means provided for turning the wheels are connected to an automatic steering system for automating the guidance of the vehicle.

The major advantage here is that a skidding vehicle is automatically brought back into a state in which it has appropriate ground adhesion and is thus made steerable again. It is thereby possible to significantly increase the safety of a vehicle in the case of correspondingly extreme weather conditions, for example.

It is very particularly advantageous here if, when a transition from static friction to dynamic friction between the wheel and ground covering is detected, the control unit turns the wheels with the aid of the steering means in such a way that the direction of running of the wheels is aligned in the direction of motion. The direction of motion can be determined with the aid of a GNS system, for example. Thus, the wheels are then turned in the direction of skidding, with the result that they can make a transition back from dynamic friction to static friction, and hence the vehicle once again has appropriate ground adhesion.

However, it is also conceivable that, when the transition from static friction to dynamic friction has been detected, the wheels are turned in the direction of motion until the dynamic friction between the wheel and the ground changes back to static friction. For this purpose, according to the invention, the detecting unit is furthermore designed to detect a reverse transition from dynamic friction to static friction between the wheel and the ground covering, thus making it possible correspondingly to detect when the wheel again has ground adhesion to enable the vehicle to be guided. This makes it possible to ensure that the wheels cannot be turned back as far as the direction of motion of the vehicle but only until there is once again static friction between the wheel and the ground covering. When steering the wheels in one direction, for example, it is thus possible to ensure that at least some of the guidance direction is retained and the wheels are not realigned exactly in the direction of motion.

When the transition from static friction to dynamic friction is detected or when the reverse transition from dynamic friction to static friction is detected, it is particularly advantageous if this detection of the transition is obtained by means of a threshold value. In this way, it is possible to prevent a situation where slight skidding or even slip, for example, is incorrectly detected as a transition from static to dynamic friction.

The transition from static to dynamic friction and the reverse transition from dynamic to static friction can advantageously be determined in such a way that a sensor for measuring the speed of rotation is arranged on the wheel, a transition being detected when a theoretical vehicle speed correlated with the speed of rotation of the wheel deviates from the actual vehicle speed, which can likewise be determined by means of a GNS system, for example. The speed of rotation of the wheel correlates with the vehicle speed, a transition from static to dynamic friction being detected when the theoretical vehicle speed obtained from the speed of rotation is less than the actual vehicle speed. If the theoretical speed obtained from the speed of rotation of the wheel is 0, the wheel is locked up.

The transition from static to dynamic friction or the reverse transition can advantageously also be determined according to the steering angle relative to the longitudinal axis of the vehicle and the actual direction of motion. If the actual direction of motion of the vehicle deviates from the theoretical direction of motion which ought to result from the steering angle, it is possible to infer that the wheel or wheels is/are losing ground adhesion and are skidding, it thus being possible to assume dynamic friction between the ground covering and the wheel.

The present invention is suitable particularly for aircraft which have a steerable undercarriage and turn their undercarriage in a particular direction after landing or touchdown of the aircraft on the runway in order to steer the aircraft during the rollout phase. At the high speeds involved and with a poor ground covering, the wheels may lose adhesion and begin to skid, with the result that the guidance stability of the aircraft is limited. Through readjustment of the wheels in the direction of skidding, the wheels recover adhesion and, as a result, the brakes also work more effectively.

BRIEF DESCRIPTION OF THE DRAWINGS

The invention is explained in greater detail by way of example with reference to the attached drawings, in which.

DETAILED DESCRIPTION

Figure 1:
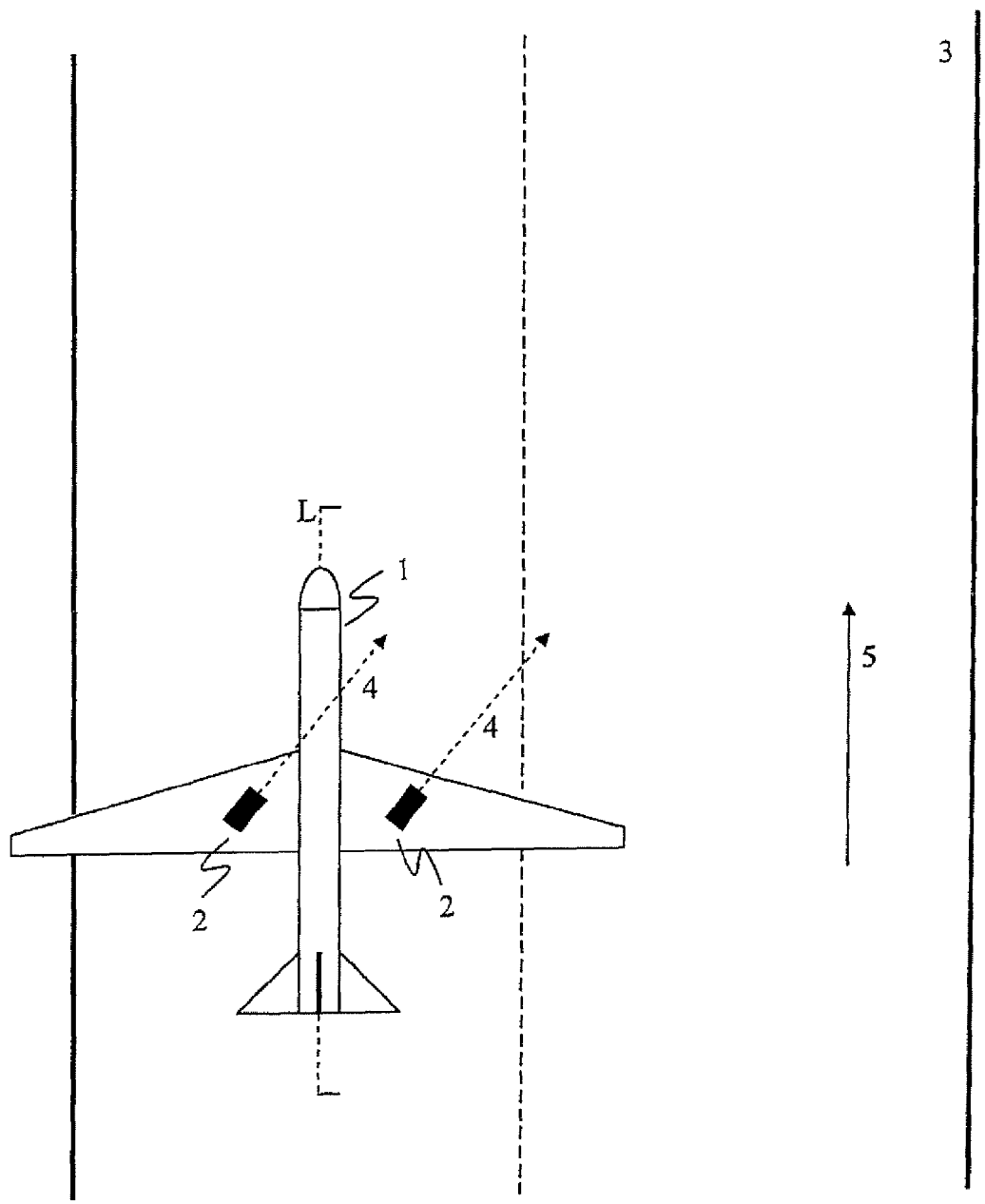
FIG. 1—shows a schematic representation of a landed aircraft with skidding tires.

FIG. 1 shows schematically a landed aircraft 1, the undercarriage (steering means) of which and hence also the wheels 2 of the main undercarriage have been turned in the direction of the center of the runway 3 in order to guide the aircraft 1 in this direction shortly after touchdown. The direction of running of the wheels 2 is indicated by the dashed arrows 4 and deviates from the actual direction of motion 5 of the aircraft 1.

In the schematically illustrated example of FIG. 1, the static friction between the wheels 2 and the runway 3 has changed to dynamic friction, with the result that the aircraft continues to move in its primary direction of motion 5, which is parallel to the longitudinal axis of the aircraft 1. In other words, despite the wheels 2 being turned in the direction of the center of the runway, there is no guidance of the vehicle 1 in this direction since the wheels 2 do not have any adhesion.

With the aid of the detecting unit, the device then detects this state, i.e. the transition from static to dynamic friction, and initiates appropriate measures. By means of the control unit according to the invention, the undercarriage with its wheels 2 is then turned in such a way that the direction of running 4 of the wheels 2 is turned in the direction of motion until the dynamic friction between the wheels 2 and the runway 3 changes back to static friction and the aircraft 1 again has appropriate adhesion. This is illustrated schematically in FIG. 2.

Figure 2:
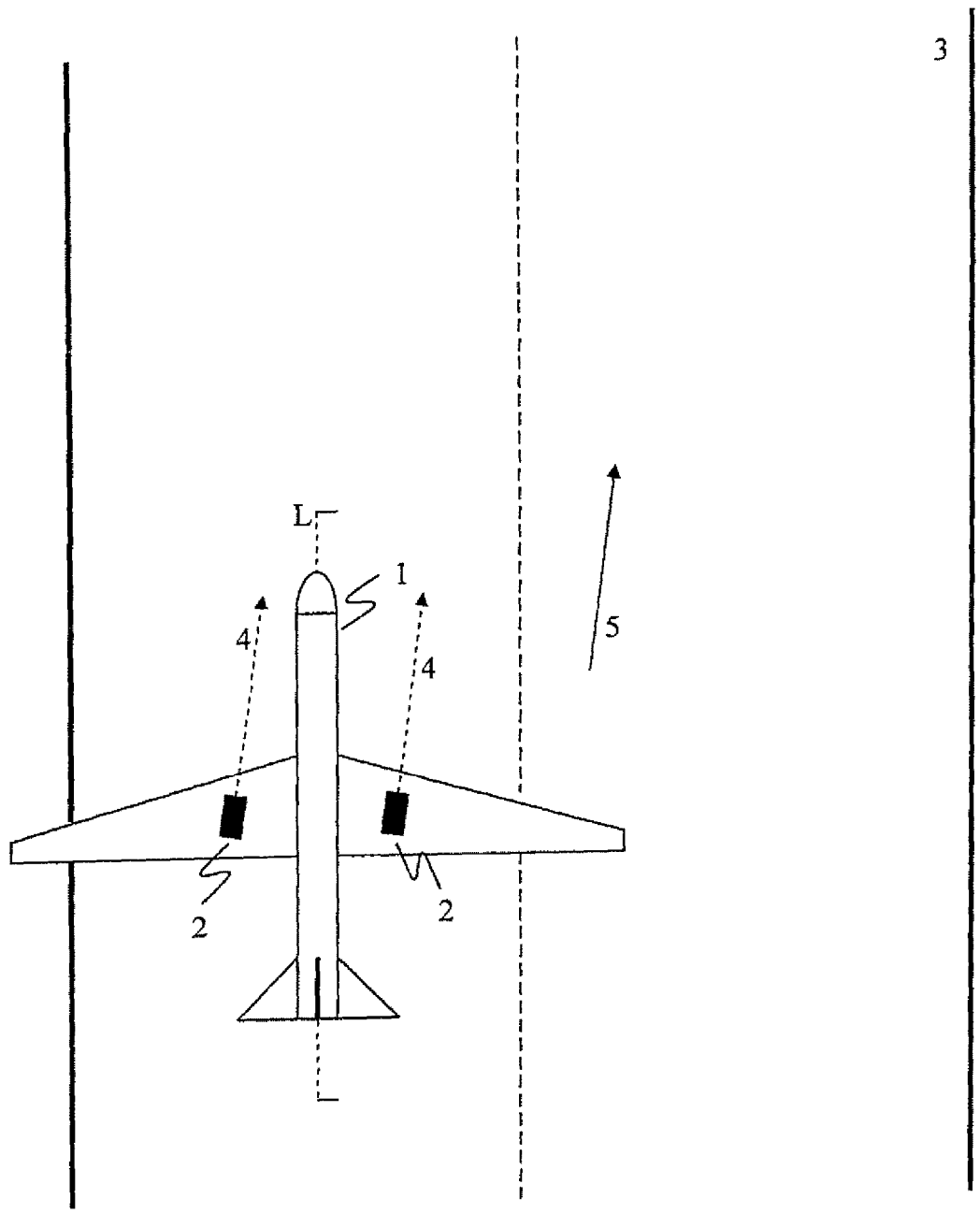
FIG. 2—shows a schematic representation of a landed aircraft with corresponding ground adhesion.

The wheels 2, as illustrated in FIG. 2, have been turned until the dynamic friction has changed back to static friction. However, the wheels have not been turned until they are aligned parallel to the longitudinal axis of the aircraft but only until there is static friction again. The aircraft 1 then begins immediately with guidance in the then prevailing direction 5, and the aircraft is therefore stabilized and can be steered and braked safely.

Figure 3:
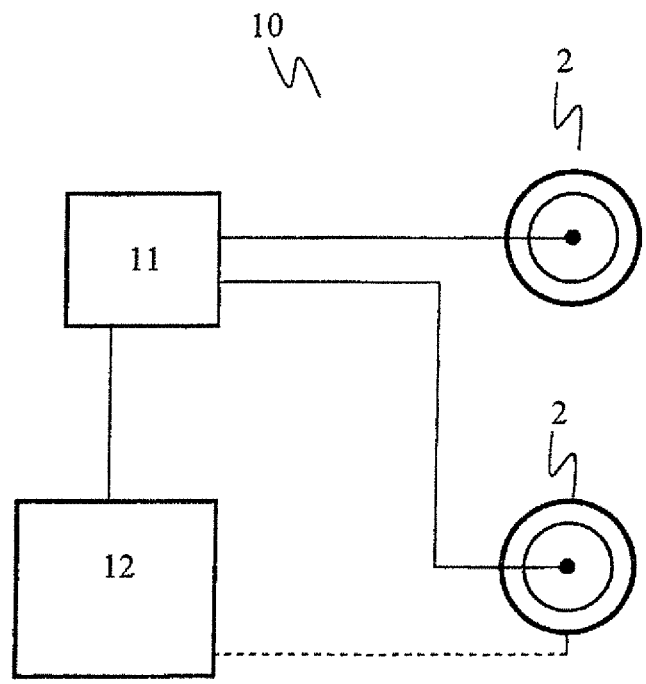
FIG. 3—shows a schematic representation of the device.

FIG. 3 shows a schematic representation of the device 10. The device has two wheels 2 in order to guide a vehicle (not shown) in a particular direction or in order to ensure so-called transverse guidance of the vehicle. In this case, the wheels 2 can be turned or pivoted relative to the longitudinal axis of the vehicle, this being accomplished by means of appropriate steering means (not shown), which are sufficiently well known from the prior art.

The device 10 furthermore has a detecting unit 12, which is designed to detect a transition from static friction to dynamic friction between the wheels 2 and the ground covering 3 in contact with said wheels 2. This detection can be accomplished, for example, with the aid of a rotation sensor, which continuously measures the speed of rotation of the wheels 2 and, if there is a deviation between the actual vehicle speed and a theoretical vehicle speed correlated with the speed of rotation of the wheels 2, infers a transition from static to dynamic friction and vice versa.

The detecting unit 12 is furthermore connected to a control unit 11, which is designed to turn the wheels with the aid of the steering means. If the detecting unit 12 detects a transition from static to dynamic friction, i.e. skidding of the wheels 2, it communicates this fact to the control unit 11, with the result that the control unit 11 then turns the wheels 2 in the direction of the longitudinal axis of the vehicle, for example, thus enabling the wheels 2 to regain ground adhesion, that is to say allowing a transition to take place from dynamic friction to static friction.

In this way, it is possible to reestablish the guidance stability of the vehicle lost due to the skidding of the wheels. Ultimately, this can contribute to air traffic safety.

The invention claimed is:

1. A device for stabilizing the guidance of a vehicle having at least one wheel arranged to be pivoted relative to a longitudinal axis (L) of the vehicle, and steering means that interact with the at least one wheel to guide the vehicle by turning the at least one wheel, comprising:
   a detecting unit which detects an at least partial transition from static friction to dynamic friction between the at least one wheel and a ground covering; and
   a control unit, which, when the detecting unit detects the at least partial transition from static friction to dynamic friction, turns the at least one wheel with the steering means in such a way that the dynamic friction between the at least one wheel and the ground covering changes back to static friction,
   wherein the control unit turns the at least one wheel according to a direction of motion of the vehicle in such a way that, when the at least partial transition from static friction to dynamic friction is detected, a direction of running of the at least one wheel is turned in the direction of motion of the vehicle.

2. The device according to claim 1, wherein the detecting unit detects a reverse transition from dynamic friction to static friction between the at least one wheel and the ground covering, and the control unit turns the at least one wheel in such a way that the at least one wheel is turned until the reverse transition from dynamic friction to static friction is detected by the detecting unit.

3. The device according to claim 1, wherein the detecting unit detects at least one of the at least partial transition from static friction to dynamic friction and a reverse transition from dynamic friction to static friction according to a threshold value.

4. The device according to claim 1, wherein the detecting unit is connected to a sensor for measuring a speed of rotation, wherein said sensor is arranged on the at least one wheel, and wherein said detecting unit detects at least one of the at least partial transition from static friction to dynamic friction and a reverse transition from dynamic friction to static friction according to a deviation between a theoretical speed of the vehicle correlated with the speed of rotation of the at least one wheel and an actual speed of the vehicle.

5. The device according to claim 1, wherein the detecting unit detects a steering angle of the at least one wheel, and detects at least one of the at least partial transition from static friction to dynamic friction and a reverse transition from dynamic friction to static friction according to a deviation between the steering angle and an actual direction of motion of the vehicle.

* * * * *